Patented Dec. 11, 1923.

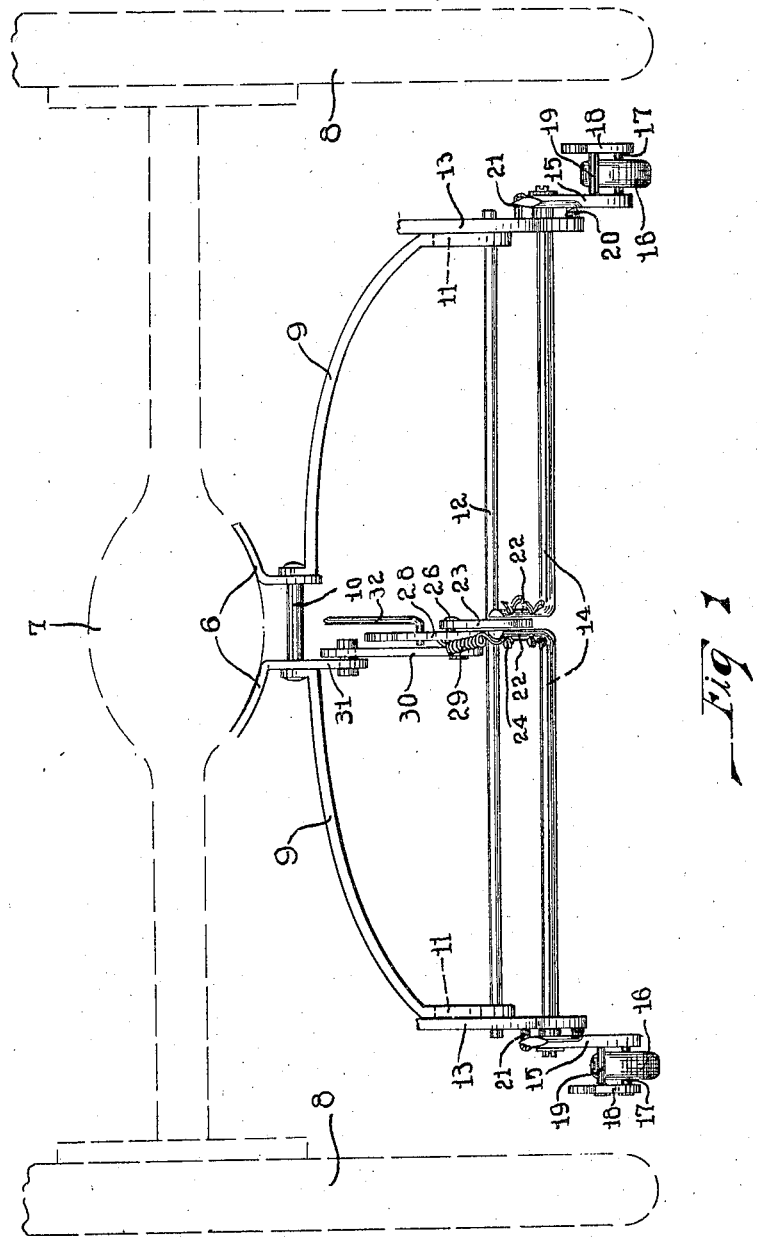

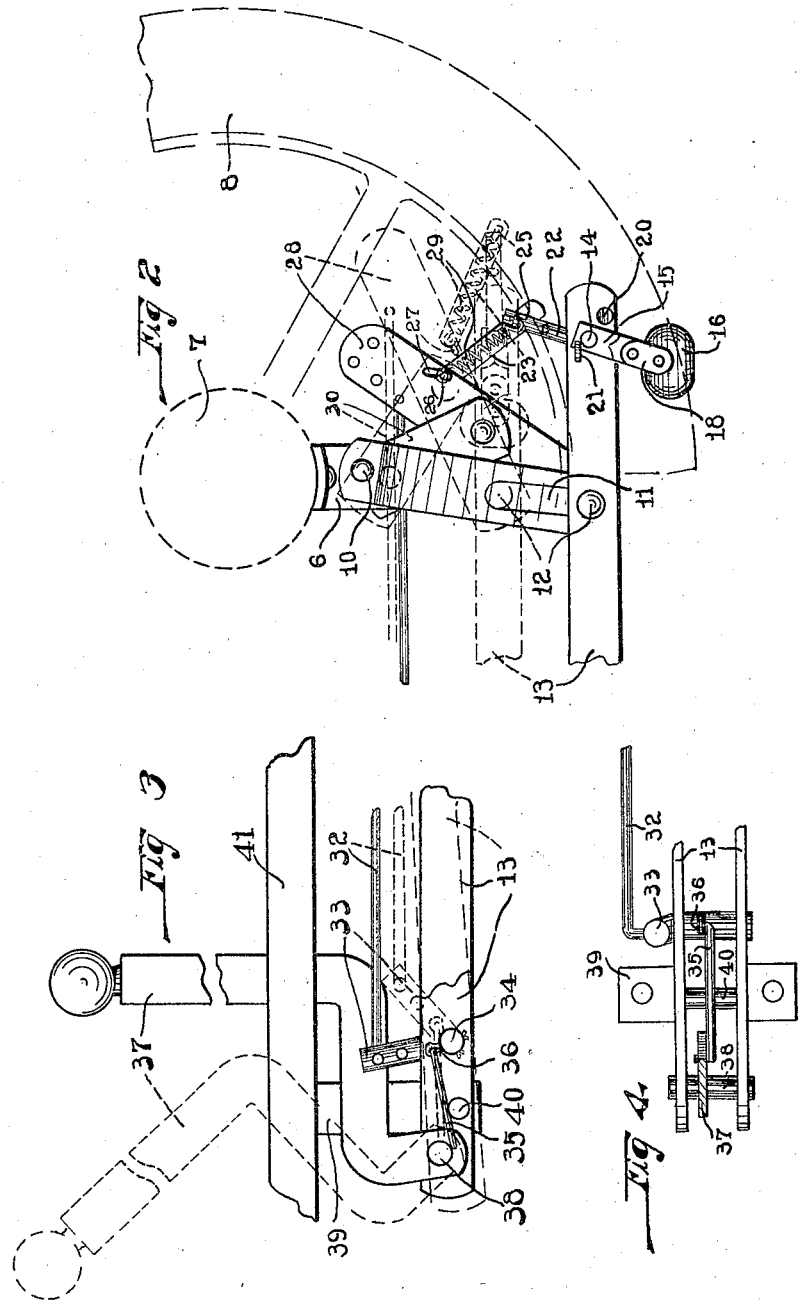

1,476,716

UNITED STATES PATENT OFFICE.

WILLIAM KALMAN, OF CHICAGO, ILLINOIS.

ANTISKID DEVICE.

Application filed November 24, 1920. Serial No. 426,272.

*To all whom it may concern:*

Be it known that I, WILLIAM KALMAN, a citizen of the United States, and a resident of the city of Chicago, county of Cook, and State of Illinois, have invented certain new and useful Improvements in Antiskid Devices, of which the following is a specification.

My invention relates to new and useful improvements in anti-skid devices, and has for its object the provision of an anti-skid device which will be simple and durable in construction and effective in use.

Other objects will appear hereinafter.

The invention consists in the combinations and arrangements of parts hereinafter described and claimed.

The invention will be best understood by reference to the accompanying drawings forming a part of this specification, and in which, Fig. 1 is a rear view showing the device attached to the axle housing of a motor vehicle;

Fig. 2 is a fragmentary side view thereof showing the rear part of the device, indicating the operative position in full lines and the inoperative position in dotted lines;

Fig. 3 is a fragmentary side view of the forward part of the device, also showing the operative position in full lines and the inoperated position in dotted lines; and, Fig. 4 is a plan view of the parts illustrated in Fig. 3.

The preferred form of the construction, as illustrated in the drawings, comprises a bracket 6 fastened to the chassis of a motor vehicle as to the axle housing 7 supported by the wheels 8.

Braces 9 are connected at their upper ends to the bracket 6 by means of a pin 10 and are provided at their lower ends with slots 11. A rod 12 is mounted for vertical movement in said slots and has its ends connected to longitudinal bars 13, which pivotally support adjacent their rear ends a pair of crank rods 14. Each crank rod has a crank arm 15 non-rotatably connected to its outer end, the lower end of each arm supporting an anti-skid wheel 16, preferably composed of, or having a rim of, felt, leather, rubber, or the like, and substantially elliptical in shape. This wheel is rotatably mounted on a shaft 17 connected with one end to the arm 15 and with the other end to a plate 18 which is in turn connected by means of a pin 19 to said arm 15 and above the wheel 16. Stop lugs 20 and 21 are provided on the bar 13 to limit the forward and the rearward movement of the crank arm and wheel respectively.

The crank rods 14 are provided at their inner ends with upturned portions 22 which embrace and are connected to a link 23 by means of a pin 24 passing through said portions and through a slot 25 in said link. The other end of said link 23 carries a pin 26 which passes through a slot 27 in a lever 28. A coil spring 29 is connected to the pins 24 and 26 which extend through the slots 25 and 27, respectively. The spring draws said pins in the lower parts of said slots when the wheels are forced firmly in contact with the roadway and in operative position, and affords a yielding pressure to the wheels upon the roadway. A supporting link 30 is pivotally connected to said lever near the central portion and to an extension 31 of the bracket 6.

The lever 28 has a number of openings for the reception of one end of an operating rod 32, the other end of said rod being connected to the vertical arm 33 of a crank 34, the horizontal arm of which passes through and is pivotally supported in the longitudinal bars 13. A link 35 is connected to a pin 36 extending from said crank 34, between the bars 13, and is connected to the lower end of an operating lever 37 which is mounted on a pivot 38 passing through said longitudinal bars, which are spaced by a pin 40 and fastened to the chassis 41 with brackets 39 or in any suitable manner.

In operation the device is normally held in its elevated or inoperative position. To retain the device in this position the lever 37 is thrown forward as shown in dotted outline in Fig. 3, whereby the forward end of the link 35 is elevated into a right line position with the pivot pin 38 which passes through the lever, or into a position wherein the axis of the link passes slightly above the axis of said pin. This is the dead center position of the link and lever, which locks the entire device in elevated or inoperative position. The anti-skid wheels and the connected links and levers are then also carried in the elevated position, as shown in dotted outlines in Fig. 2. The spring then draws the pins 24 and 26 into the upper portions of the slots 25 and 27, respectively. When the operative position is desired the lever 37 is drawn firmly backwards which brings the arm 33 and link 32 forward and the lever 28 in a more vertical position. The pin 26 thereby descends downward in the slot 27 and as the link 23 moves forward with the lever 28 the spring 29 becomes stressed and the slot 25 of the link moves upwards over the pin 24. This action gives a firm but resilient pull upon the upturned portions 22 of the crank rods 14 thereby holding the anti-skid wheels firmly but resiliently upon the roadway, thus assuring effective action when travelling over an uneven surface. These anti-skid wheels have been illustrated as having a major diameter and a minor diameter in a direction at right angles thereto, that is, they are substantially elliptical, but may be made of any suitable shape. The elliptical wheels adhere to the roadway with increased firmness when the extended ends thereof come in contact with the roadway.

While I have illustrated and described the preferred form of construction for carrying my invention into effect, this is capable of variation and modification without departing from the spirit of the invention. I, therefore, do not wish to be limited to the precise details of the construction set forth, but desire to avail myself of such variations and modifications as come within the scope of the appended claims.

Having described my invention, what I claim as new and desire to secure by Letters Patent, is:—

1. An anti-skid device comprising a supporting bracket adapted to be attached to a vehicle, anti-skid means connected to said bracket, means for operating said anti-skid members, said operating means including a pair of slotted elements, pins connecting said elements and operating in the slots in said elements and a spring connected to said pins, said means resiliently retaining said members in effective contact with an uneven roadway.

2. An anti-skid device comprising a bracket attachable to a vehicle, a link pivotally connected to said bracket, a slotted lever connected to said link, a slotted link having pin connection with the slot in said lever, anti-skid members having pin connection with said slotted link, and operating means for sliding said pins to opposite ends of said slots in the operative and the inoperative position and to resiliently retain said members in effective contact with an uneven roadway.

3. An anti-skid device comprising a bracket attachable to a vehicle, a link pivotally connected to said bracket, a slotted lever connected to said link, a slotted link connected to the slot in said lever, anti-skid members connected to said slotted link, a spring connected to pins passing through said slotted link and lever, and operating means resiliently retaining said anti-skid members in contact with the roadway.

4. An anti-skid device comprising a bracket attachable to the axle housing of a vehicle, means including slotted members connected to said bracket, a pair of crank rods connected to said slotted members and extending outwardly therefrom, anti-skid members connected to the outer ends of said crank rods, and means for operating and resiliently retaining said anti-skid members in contact with the roadway.

5. An anti-skid device comprising a support attachable to a vehicle, a pair of longitudinal bars mounted on said support, an operating lever pivotally mounted on said bars, anti-skid members mounted on said device, and means mounted in said longitudinal bars for operatively connecting said lever and said anti-skid members.

6. An anti-skid device comprising a support attachable to a vehicle, a pair of longitudinal bars mounted on said support, an operating lever pivotally mounted on said bars, a crank mounted in said longitudinal bars, a link connecting said lever and said crank, anti-skid members for said device, and means operatively connecting said crank and anti-skid members.

7. An anti-skid device comprising a support attachable to a vehicle, a pair of longitudinal bars mounted on said support, an operating lever pivotally mounted on said bars, anti-skid members for said device, and means operatively connecting said lever and said anti-skid members and capable of locking the anti-skid members in elevated position by a mere forward thrust of the lever.

8. An anti-skid device comprising front and rear supports attachable to a vehicle, longitudinal members connected to said supports, an operating lever mounted in the front support, anti-skid members, a plurality of members mounted in the rear support supporting and operating said anti-skid members, and operative connections between said lever and said anti-skid operating members.

9. An anti-skid device comprising a support attachable to a vehicle, a pair of bars mounted on said support, and operating lever pivotally mounted on said bars, a crank mounted in said bars, a link connecting said crank with said operating lever, adjacent the lever pivot, said link being movable beyond the dead center position of the link and lever, anti-skid members mounted on said bars, and means operatively connecting said crank and said anti-skid members and capable of locking the anti-skid members in elevated position by a mere forward thrust of the lever.

10. An anti-skid device comprising front and rear supports attachable to a vehicle, longitudinal members connected to said supports, an operating lever mounted in the front support, means including a slotted lever mounted in the rear support, anti-skid means mounted in said longitudinal member and resiliently connected to said lever, and operative connections between said operating lever and said slotted lever for resiliently retaining said anti-skid members in effective contact with the roadway.

11. An anti-skid brake comprising a support, rotary anti-skid wheels having a major diameter and a minor diameter at right angles to said major diameter for engaging the roadway with intermittent increased and decreased pressure during rotation of said wheels, means for mounting said wheels on said support, and resilient means for retaining said wheels with intermittent pressure in effective contact with the roadway.

12. An anti-skid brake comprising a support, rotary anti-skid wheels having a major diameter and a minor diameter at right angles to said major diameter for engaging the road-way with intermittent increased and decreased pressure during rotation of said wheels by application of said brake, means for mounting said wheels on said support, resilient means for retaining said wheels with intermittent pressure effectively in contact with the road-way when in the lowered position, and a pivoted operating lever connected with said mounting means and said support and being adapted to lock said wheels in the elevated position by a forward thrust of said lever.

In testimony whereof I have signed my name to this specification in the presence of two subscribing witnesses.

WILLIAM KALMAN.

Witnesses:
JOSHUA R. H. POTTS,
CLARENCE E. THREEDY.